United States Patent Office 3,178,615
Patented Apr. 13, 1965

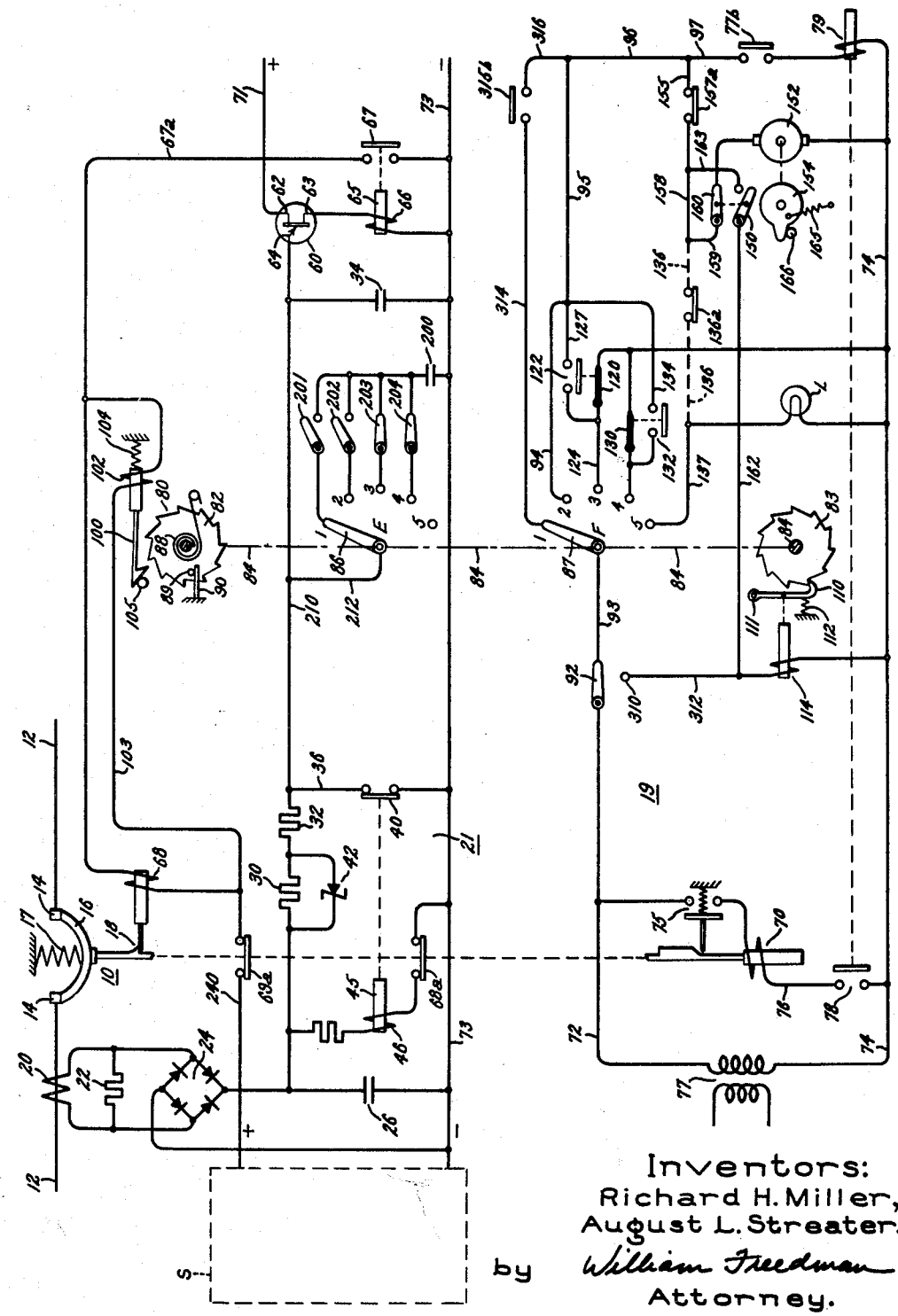

3,178,615
AUTOMATIC CIRCUIT RECLOSER
Richard H. Miller, Havertown, and August L. Streater, Broomall, Pa., assignors to General Electric Company, a corporation of New York
Filed July 3, 1961, Ser. No. 121,684
7 Claims. (Cl. 317—22)

This is a continuation-in-part of our application S.N. 119,884, filed June 27, 1961, now abandoned, and assigned to the assignee of the present invention.

This invention relates to an automatic circuit recloser and, more particularly, relates to means for improving the performance of the recloser during a fault condition closely following clearance of a preceding fault condition. In certain of its broader aspects, the invention relates also to types of line sectionalizing devices other than automatic reclosers.

The usual circuit recloser responds to the occurrence of a fault by opening and reclosing a predetermined number of times in close succession. If the fault is a permanent one, the recloser should lock out, or remain open, after a predetermined number of opening and closing operations occurring in close succession. If the fault is a temporary one that is cleared or disappears at some time prior to the instant at which lockout otherwise would have occurred, then the recloser should remain closed once the fault disappears.

After the recloser remains closed following disappearance of such a temporary fault, it is desirable that the recloser be restored to a condition that will enable it to perform a complete sequence of operations in response to a subsequent fault should such a complete sequence be needed to effect fault clearance. This desired result is attained in most reclosers if there is a relatively long time period between successive faults. But if the intervening time period is relatively short, the desired result is generally not obtained. This is particularly the case with those reclosers that are designed to open with prolonged time delay on one or more opening operations.

With regard to the performance of prior reclosers during a second fault closely following clearance of a temporary fault, some such reclosers of which we are aware will tend to fall into a pumping or cycling condition that renders them unable to reach lockout during this second fault condition. This, of course, can be a serious problem if the second fault is a permanent one. Other reclosers of which we are aware will lockout after too few operations during the second fault condition. This premature lockout is objectionable because it interferes with the ability of the recloser to perform its intended function of eventually remaining closed for faults of a temporary character.

Accordingly, an object of our invention is to provide a recloser that is completely restored to its normal condition within a very short time following disappearance of a temporary fault so that it is then capable of responding to a closely succeeding fault by operating through its complete cycle to produce lockout in the case of a permanent fault or is capable of operating a sufficient number of times to clear any temporary fault.

Another object is to provide a recloser of the above character which will lockout after a predetermined number of closely successive operations irrespective of whether there is a temporary loss of control voltage while the breaker is open.

Another object is to provide precisely-timed resetting means for restoring the controls of a recloser to their normal-at-rest condition should the recloser remain closed for a period of time only slightly in excess of the longest time delay period which it is set to open in when responding to an overcurrent.

Another object is to provide highly versatile resetting means of the character set forth in the immediately proceding paragraph which requires no changes in adjustment in order to accommodate adjustments that might be made to vary the number of operations to lockout or to change the time delay period between opening and reclosing operations.

In carrying out our invention in one form, we provide a recloser that includes means for opening the recloser in response to overcurrent and means for automatically reclosing the recloser following an opening operation. The recloser further comprises sequencing means advanceable in a step-by-step manner through a series of controlling positions. Advancement of the sequencing means through one step into a new controlling position with each opening operation in a series of closely-successive operations is produced by means that responds to initiation of an opening operation by delivering an impulse to the sequencing means. The impulse is terminated when the recloser opens, and the sequencing means thereafter remains deenergized while the recloser is open. Resetting means is provided for causing quick restoration of the sequencing means to its normal-at-rest position upon activation. Reset control means is provided for activating said resetting means after the reset control means has been continuously energized for a predetermined period commencing when said reset control means is in a normal condition. Energization of the reset control means is delayed during the interval between termination of the impulse and reclosing of the recloser and is initiated in response to reclosing. The energization proceeds on a continuous basis until the recloser opens or until the predetermined continuous energization period expires. When either of these events occurs, the reset control means is deenergized and is quickly restored to its normal condition by means sensitive to such deenergization. Restoration of the reset control means to its normal condition occurs in a small fraction of said predetermined continuous energization period.

For a better understanding of our invention, reference may be had to the following description taken in conjunction with the accompanying drawing, wherein the single figure is a schematic diagram of a circuit recloser embodying one form of our invention.

Referring now to the drawing, there is shown an automatic circuit recloser 10 for controlling the flow of current through a power line 12, which may be one phase of a polyphase A.C. power system. The circuit recloser comprises a set of stationary contacts 14 and a movable bridging contact 16 biased in a direction away from the stationary contacts by a suitable compression spring 17. The recloser 10 is normally maintained in its closed position of the drawing by a suitable trip latch 18 that can be released in a manner soon to be described to permit the spring 17 to separate the contacts 16 and 14 and thereby interrupt the flow of current through power line 12.

Ordinarily, after an opening operation, the recloser 10 is automatically reclosed so that service can be restored over the power line 12 in the event that the condition responsible for opening of the recloser is no longer present. These reclosing operations are controlled by a portion of the recloser generally designated 19 in FIG. 1.

Opening operations of the recloser 10 are controlled by a portion of the recloser generally designated 21. This opening control portion 21 is similar in many respects to the circuit breaker arrangement disclosed in copending application S.N. 74,325, Casey and Sofianek, now Patent No. 155,879, filed December 7, 1960, and assigned to the assignee of the present invention. Certain features of this tripping circuit are disclosed in greater detail and are claimed in the aforementioned Casey and Sofianek application, and reference may be had thereto if more information is desired as to these features.

Generally speaking, the opening control portion 21 is designed to trip the recloser open in response to overcurrents in the power line 12 above a predetermined pick-up value. Such tripping will occur with a time delay that varies in duration inversely with respect to the magnitude of the overcurrent. The term "overcurrent" as used in this application is intended to comprehend not only abnormally high currents flowing in any phase of a polyphase system but also unbalanced currents in excess of a predetermined value. For example, if the currents flowing in the different phases of a polyphase A.C. power system become unbalanced by more than a predetermined amount, an overcurrent may be considered present. In this latter case, the overcurrent may be thought of as being an excess of zero-phase-sequence current. Conventional ground-fault-sensitive networks are available for providing an output signal proportional to the magnitude of this unbalanced or zero-phase-sequence current. To simplify the present description, however, we have shown reclosers that are intended to operate in response to abnormally high phase currents in the power line 12.

For sensing the magnitude of the current flowing in power line 12, a current transformer secondary winding 20 magnetically coupled to the power line 12 is provided. Connected across the terminals of the current transformer winding 20 is a suitable resistor 22, across which is developed an alternating voltage that is proportional to the current flowing through the current transformer winding 20, and, hence, through the power line 12. The current transformer 20 is so designed that it will not saturate at any currents within the current range which circuit breaker 10 is intended to operate, so that for all such currents the proportional relationship of line current to the voltage developed across resistor 22 will be essentially maintained.

The voltage developed across the resistor 22 is rectified by a conventional rectifying bridge 24 connected across the resistor 22, and the full wave output from this bridge is smoothed by a smoothing capacitor 26 connected across the output terminals of the rectifying bridge. Accordingly, a relatively smooth unidirectional voltage, hereinafter termed the signal voltage, is developed across the terminals of the capacitor 26. This signal voltage is also essentially proportional to the magnitude of the current flowing through power line 12.

For developing a voltage that builds up at a rate that varies directly with respect to the magnitude of the signal voltage once the signal voltage exceeds a predetermined value, a suitable timing circuit connected across the terminals of smoothing capacitor 26 is provided. This timing circuit comprises a plurality of resistors 30 and 32 and a timing capacitor 34, all connected in series circuit relationship when the timing circuit is active. Normally, the timing circuit is rendered inactive by a low impedance discharge circuit 36 shunting the timing capacitor 34 and preventing a significant charge from being built up across the capacitor. The timing circuit is rendered active only when a set of contacts 40, connected in the discharge circuit 36, are opened to interrupt the discharge circuit. This is done in a manner soon to be explained.

The timing circuit is designed so that once it becomes active, the voltage across the timing capacitor 34 builds up to a predetermined critical level (soon to be described) in a time inversely proportional to approximately the square of the overcurrent for low values of overcurrent. For high values of overcurrent, this time is inversely proportional to a lower power of the overcurrent. This change in timing for different levels of overcurrent is achieved by means of a Zener diode 42 shunting one of the resistors 30. This relationship, which is not a part of our invention, is disclosed in more detail and is claimed in application S.N. 138,476, Dewey, now Patent No. 3,105,920, filed September 15, 1961, and assigned to the assignee of the present invention.

For rendering the timing circuit active when the current in power line 12 exceeds a predetermined value, which is referred to hereinafter as the pickup rating of the recloser, a gating relay 45 having an operating coil 46 connected across the terminals of the smoothing capacitor 26 is provided. This gating relay includes the aforementioned normally closed contacts 40 that are connected in the discharge circuit 36 around the timing capacitor 34. When the signal voltage developed across smoothing capacitor 26 exceeds a predetermined value (corresponding in magnitude to the rated pickup current of the recloser), the coil 46 of the relay becomes sufficiently energized to cause the relay to operate and open its contacts 40. This removes the discharge circuit 36 from around the timing capacitor 34 and thus allows the timing capacitor to begin its timing function, i.e., renders the timing circuit active.

For tripping the circuit breaker 10 when the output voltage from the timing circuit reaches a predetermined value, a level detector 60 in the form of a silicon unijunction transistor is provided. This unijunction transistor 60 is of a conventional form, such as disclosed and claimed in U.S. Patent No. 2,769,926, Lesk, assigned to the assignee of the present invention, and it will therefore be explained only in sufficient detail to provide an understanding of the present invention. Referring now to the unijunction transistor 60, 62 and 63 represent the two bases of the transistor, and 64 represents the emitter of the transistor. The two bases 62 and 63 are connected across a source of control voltage comprising a positive bus 71 and a negative bus 73 between which a constant voltage is maintained. So long as the voltage between the emitter 64 and the lower base 63 is below a certain critical value, called the peak point emitter voltage, a very high resistance is present between the emitter and the two bases, and therefore no significant amount of current flows in the circuit of emitter 64. However, when the emitter voltage is increased to this critical peak point emitter voltage, the transistor 60 fires, i.e., the resistance between its emitter 64 and base 63 suddenly drops, allowing greatly increased current to flow from the emitter 64 through the base 63. This greatly increased current is derived from the timing capacitor 34, which, in response to firing of the transistor 60, quickly discharges through the circuit including the emitter 64 and the base 63. Connected in series-circuit relationship with the lower base 63 is the coil 66 of a tripping relay 65. The abruptly increased current that flows through the base 63 in response to firing of the transistor 60 also flows through this coil 66, causing the relay 65 to pick up and close its contacts 67. Closing of the contacts 67 completes a tripping circuit through a trip coil 68 of the latch 18. The trip coil 68 responds by releasing the latch 18 to allow the breaker 10 to open under the bias of its opening spring 17. When the breaker 10 opens, an A switch 69a connected in the tripping circuit opens to interrupt the tripping circuit. The power source for the tripping circuit is shown within a dotted line box S and comprises a positive bus 240 and negative bus 73 common to this and other circuits. The trip circuit extends from the positive bus 240 to the negative bus 73 through the A switch 69a, trip coil 68, conductor 67a, and contacts 67. The details of this source S form no part of the present invention and have been omitted from this description for the sake of simplification.

While we have shown an electromagnetic type tripping relay for initiating tripping in response to firing of level detector 60, it should be understood that other types of electroresponsive switches can equally well be used for initiating tripping in response to firing of the level detector, e.g., a silicon controlled rectifier triggered by the voltage developed when current flows through a suitable resistor (not shown) connected between base 63 and the negative bus 73.

When the recloser opens, the gating relay 45 is dropped out either due to the loss of signal voltage across the smoothing capacitor 26 that results from the interruption of current in power line 12 or due to opening of a conventional A switch 68a coupled to the main contacts of the recloser and in series with the coil 46 of the gating relay, depending upon which of these events occurs first. When the gating relay 45 drops out, it closes its contacts 40 to complete the discharge circuit 36 and thus assure that the capacitors of the timing circuit will be drained of their charge.

The closing control portion 19 of the recloser is designed to automatically reclose the circuit breaker 10 after this first opening operation. For producing such reclosing, a suitable closing device, such as a solenoid 70, is provided. The armature of this solenoid 70 is mechanically connected through a suitable mechanism (not shown) to the bridging contact 16 and operates the bridging contact to its closed position of FIG. 1 when the solenoid is energized and operated. The coil of the solenoid 70 is connected in an energizing circuit 76 extending between the opposite terminals 72 and 74 of a suitable source of control power for closing. In FIG. 1 this source is illustrated as a transformer 77, which is capable of supplying constant frequency alternating current. Also connected in this energizing circuit 76, and in series with the coil of solenoid 70, are a limit switch 75 that is arranged to close in response to opening of the circuit breaker and a set of closing-control contacts 78. When the closing control contacts 78 are closed, they complete this energizing circuit 76 and thus cause the solenoid 70 to drive the recloser's contact 16 into closed position. The closing control contacts 78 are the normally open contacts of a reclosure-initiating relay 79 that is operated to close its contacts 78 in response to circuit breaker opening in a manner soon to be described. When the contacts 16 of the recloser enter their closed position, the limit switch 75 opens to interrupt the energizing circuit for the closing solenoid 70. In addition, a B switch 77b in series with the coil of the reclosure-initiating relay 79 opens upon completion of the closing stroke to drop out the relay 79. This B switch 77b is mechanically connected to the main contacts of the circuit breaker in a conventional manner (not shown) so as to open when the circuit breaker is closed and to close when the circuit breaker is open.

For controlling the reclosure-initiating relay 79 and for performing certain other control functions soon to be explained, a counting or sequencing device 80 is provided. In its schematic form of FIG. 1, this sequencing device 80 comprises a pair of ratchet wheels 82 and 83 that are fixed to a rotatable shaft 84 for movement in unison. Also fixed to the rotatable shaft 84 are two angularly-movable switching arms 86 and 87 which move in unison with each other and with the ratchet wheels 82 and 83. These switching arms constitute portions of stepping switches E and F, respectively. After each opening operation on which automatic reclosing is desired, this sequencing device 80 operates to set up an energizing circuit for the reclosure-initiating relay 79. This will be explained more fully after the sequencing device is described in greater detail.

The ratchet wheel 82 is normally maintained in its position of the drawing by means of a suitable coil spring 88 urging the ratchet wheel 82 in a counterclockwise direction. This coil spring 88 serves as a resetting means for the sequencing device 80 in a manner soon to be described. A suitable stop 89 provided on the ratchet wheel 82 abuts against a stationary abutment 90 to assure that the ratchet wheel will not move counterclockwise past its position of the drawing. When the ratchet wheel 82 is in its illustrated position, each of the switching arms 86 and 87 engages its corresponding first contact, designated 1.

When the ratchet wheel is advanced in a clockwise direction through one step (in a manner soon to be explained), the switching arms 86 and 87 are advanced through one step into a position where each engages its next contact 2. Each additional advancing step of the ratchet wheel moves the switching arms 86 and 87 through an additional step, causing each of the switching arms to successively engage its contacts 3, 4, and 5.

When the contact 2 is engaged by the switching arm 87, an energizing circuit for the reclosure-initiating relay 79 is established, and this results in closing of the recloser, as was described hereinabove. This energizing circuit for the reclosure-initiating relay 79 extends from one bus 72 through a manually operable switch 92, conductor 93, the conductive switching arm 87, contact point 2, conductors 94, 95, 96, and 97, the then-closed B switch 77b, the coil of relay 79 to the opposite bus 74. The reclosure-initiating relay 79 responds to completion of this energizing circuit by closing its contacts 78 to produce a reclosing operation. When the contacts 3 and 4 of the stepping switch F are engaged by the switching arm 87, similar energizing circuits for the reclosure-initiating relay 79 are set up, but a detailed description of these will be deferred until later in this application.

The ratchet wheel 82 of the sequencing device 80 is advanced through each of the above described steps in response to opening operations of the recloser. In this regard, each time the recloser is tripped to open, the ratchet wheel is advance one step. If a series of opening operations should occur in close succession, the ratchet wheel 82 and the switching arms 86 and 87 will move successively through positions 2, 3, 4, and 5. But if the recloser, after reclosing, it able to remain closed for more than a predetermined time the resetting spring 88 will return the ratchet wheel 82 to its normal position shown in a manner soon to be described.

For advancing or notching the ratchet wheel 82 in response to each opening operation of the recloser, a notching pawl 100 is provided. This notching pawl 100 is arranged to be energized by a notching solenoid 102 that is connected in a shunt circuit 103 paralleling the trip coil 68 of the recloser. Thus, each time the tripping relay 65 completes a tripping circuit through the trip coil 68, the notching solenoid 102 is energized to drive the pawl 100 to the right a predetermined distance. During this motion to the right, the notching pawl 100 is in engagement with a tooth of the ratchet wheel 82, and thus the ratchet wheel is advanced in a clockwise direction through one step in response to each tripping operation of the recloser. When the recloser trips open in response to operation of its tripping solenoid 68, the A switch 69a opens to disconnect the notching circuit 103 from the positive bus 240 of the tripping source S.

This deenergizes the notching solenoid 102, allowing a reset spring 104 to return the notching pawl 100 to its position of FIG. 1. When the notching pawl returns to its position of FIG. 1, a stationary pin 105 engages the notching pawl, camming it upwardly to disengage it from the periphery of the ratchet wheel 82 so that the ratchet wheel is later able to reset without interference from the notching pawl 100 should more than a predetermined time elapse between successive openings of the recloser.

It will be apparent that the impulse applied from the source S to the notching solenoid 102 is terminated by opening of the A switch 69a upon opening of the circuit breaker. In opening, the A switch 69a isolates the notching solenoid 102 from the source S and thus prevents the notching solenoid 102 from receiving any further energy from the source S until the recloser is reclosed. When reclosing occurs, the A switch 69a closes and thus enables the source S to supply another impulse to the notching solenoid whenever the tripping relay 65 closes its contacts 67.

For preventing the resetting spring 88 from causing the ratchet wheel 82 to reset from an advanced position to its normal-at-rest position of the drawing between closely successive opening operations of the recloser, a holding pawl 110 acting on the periphery of the other ratchet wheel 83 is provided. This holding pawl is biased about a stationary pivot 111 into engagement with the periphery of ratchet wheel 83 by a spring 112. If successive advancing operations of the notching pawl 100 closely follow one another then the holding pawl 110 will maintain the ratchet wheels 82 and 83 in their advanced position between advancing operations. Under such conditions, the notching operations will have a cumulative effect in advancing the ratchet wheel 82 and will thus drive the switching arms 86 and 87 successively through positions 2, 3, 4 and 5 in response to closely successive opening operations of the recloser 10.

If, on the other hand, the notching operations of notching pawl 100 do not closely follow one another, the holding pawl 110 will eventually be disabled, i.e., moved out of engagement with the ratchet wheel 83 to allow resetting of ratchet wheels 82 and 83 back to their position of FIG. 1 under the influence of reset spring 88. Such disabling of the holding pawl 110 is effected (in a manner soon to be described) by a reset solenoid 114 which operates a predetermined time after the recloser 10 reaches closed position to drive the holding pawl 110 clockwise out of engagement with ratchet wheel 83, assuming that the recloser remains closed. In more general terms, the overall effect of this resetting operation is to restore the sequencing device 80 to its normal at rest position of FIG. 1 in the event that the recloser is able to remain closed, say, as a result of the fault on the power line 12 disappearing or having been removed.

As was pointed out hereinabove, the switching arm 87 of the stepping switch F sets up an energizing circuit for the reclosure-initiating relay 79 each time it moves into new positions 2, 3 and 4. The energizing circuit for relay 79 that is established by movement of the switching arm 87 into position 2 has been described hereinabove. Briefly summarizing, however, this energizing circuit extends from one bus 72 to the opposite bus 74 through the conductive parts 92, 93, 87, 2, 94–97, 77b and 79. Completion of this energizing circuit causes the reclosure-initiating relay 79 to operate and thus effect closing of the recloser. Should the fault on power line 12 still be present when the recloser is reclosed, then the recloser would again trip open and notching solenoid 102 would respond by advancing the switching arm 87 through another step into contact position 3. Movement of the switching arm into the contact position 3 results in completion of another energizing circuit for reclosure-initiating relay 79, but only after a predetermined time delay, which constitutes a time delay between opening and reclosing of the circuit breaker. In this regard, movement of the switching arm 87 into position 3 first produces energization of a time delay pick-up relay 120. This relay 120 is preferably of the thermally-operated type so that it closes its contact 122 after current has flown through its thermal element for a predetermined period. When the contacts 122 are closed after this predetermined period, they complete an energizing circuit for the reclosure-initiating relay 79 to effect another closing operation of the recloser. The energizing circuit for the thermal relay 120 is from one bus 72 through conductive parts 93, 87, 3, conductor 124, the thermal element of relay 120, and conductor 126 to the opposite bus 74. The energizing circuit for the reclosure-initiating relay 79 that results from closing of the contacts 122 of the thermal relay is from bus 72 through conductive parts 92, 93, 87, 3, conductor 124, contacts 122, conductors 127, 95, 96, 97, 77b, and the coil of relay 79 to the opposite bus 74.

Should the fault on the line 12 still be present when the recloser closes, the recloser will again trip open and notching solenoid 102 would respond by advancing the sequencing device 80 one step to move the switching arm 87 into its position 4. This results in completion of another energizing circuit for reclosure-initiating relay 79, but only after a predetermined time delay, which constitutes a time delay between the third opening and reclosing of the circuit breaker. This time delay is introduced by another thermally controlled relay 130 (corresponding to the previously described relay 120) which operates after a predetermined interval to close its contacts 132 and complete an energizing circuit for the reclosure-initiating relay 79 that extends through the switching arm 87, contact 4, contacts 132, and conductor 134. The reclosure-initiating relay 79 responds by again causing the recloser to reclose.

If the fault should still be present on power line 12 when the third reclosing has occurred, the recloser will again trip open, but after this opening operation no further reclosing operations will occur until the recloser is manually reset. In other words, the recloser will be locked out.

This lockout action occurs by virtue of the fact that the switching arm 87 moves into contact position 5 after the fourth closely successive opening operation. No circuit through the reclosure initiating relay 79 results from motion of the switching arm 87 into position 5 because the reclosure-initiating relay 79 is isolated from the contact 5 by means of a then-open A switch 136a. This switch 136a is controlled in a known manner (not shown) by the position of the circuit breaker and opens as soon as the breaker opens, closing when the circuit breaker closes. Thus, no energizing circuit for the relay 79 can be established through contact point 5. Since no other connections are then present from the relay 79 to the positive bus 72, the reclosure-initiating relay 79 remains deenergized and thus no further closing operations of the recloser occur.

To provide an indication of lockout, a lockout-indicating light L is provided in circuit with the contact 5 of the switching arm 87. When the switching arm 87 reaches contact 5, an energizing circuit through this lockout-indicating light would be established. This energizing circuit extends from positive bus 72 through parts 92, 93, 87, 5, 137 and L to the negative bus 74.

As was pointed out hereinabove, sequencing device 80 is adapted to reset to its normal-at-rest position of FIG. 1 if the breaker should remain closed after any reclosing operation prior to lockout. This resetting action is effected by releasing the holding pawl 110 from the ratchet wheel 83 as predetermined time after the breaker reaches closed position should it remain closed. Release of the holding pawl 110 from the ratchet wheel is referred to hereinafter as activation of the resetting means 88, since it is this release that allows the resetting spring 88 to effect a resetting operation of the sequencing device 80. A resetting solenoid 114 is relied upon for such activation and is controlled by a normally-open switch 150 which is caused to close a predetermined time after the breaker reaches closed position should th breaker remain closed. For effecting closing of the normally open switch 150 in this manner, reset control means comprising a timing motor 152, preferably of the synchronous type, and a rotary cam 154 coupled to the rotor of the motor 152 are provided. As soon as the breaker reaches closed position, the motor 152 is energized through a circuit that includes the last contact made by the switching arm 87. For example, when the switching arm is in position 2, this circuit for motor 150 extends from one bus 72 through conductive parts 92, 93, 97, 2, 94, 95, 96, 155, a then-closed A switch 157a, conductors 158, 159, then-closed switch 160, and then through the motor 152 to the opposite bus 74. This circuit is completed upon closing of the circuit breaker by the A switch 157a which is controlled in a conventional manner (not shown) to open in response to closing of the circuit breaker, so that operation of the motor 152 begins only when the recloser reaches closed position. The motor responds by driving the cam 154 clockwise in a direction to close the switch 150. The motor is continuously energized so long as the breaker remains closed or until a limit switch 160 is opened by the motor at the end of its travel. If the breaker remains closed for a long enough time, the cam 154 will eventually close the switch 150 and shortly thereafter open the limit switch 160. Closing the switch 150 completes an energizing circuit for the reset solenoid 114 through the conductive parts 163, 150, 162, etc. Completion of this energizing circuit causes the solenoid 114 to release the holding pawl 110 and allows the sequencing device 80 quickly to reset under the influence of its then-activated reset spring 88, as described hereinabove. Opening of the limit switch 160 effects deenergization of the motor 152, allowing the return spring 165 quickly to reset the cam 154 to its normal position of FIG. 1.

Had the recloser, instead of remaining closed, reopened shortly after reclosing, then no release of the holding pawl 110 would have occurred. In this connection, opening of the recloser would have taken place before the timing motor 152 would have had an opportunity to close the switch 150, and thus the timing motor would have been deenergized by the opening of the A switch 157a, which opens when the recloser opens. This would have allowed motor-reset spring 165 to quickly return the cam 154 to its normal position of the drawing, and no releasing of the holding pawl 110 would have occurred. This would permit cumulative advancement of the sequencing device, as is desired when the recloser opens shortly after reclosing.

Most present day reclosers have two time-current characteristics controlling the period of time that elapses between the instant that overcurrent commences and the instant that the recloser opens its contacts. Typically, the first one or two opening operations in a series of closely successive opening operations occur with relatively little time delay, but subsequent opening operations occur with appreciably greater time delay. The opening operations that occur with little time delay will be referred to hereinafter as quick opening operations, whereas those opening operations that occur with appreciably greater time delay will be referred to as delayed opening operations.

For determining whether an opening operation shall be a quick operation or a delayed operation, the disclosed recloser relies upon the switching arm 86 to control the amount of capacitance that will be present in the R-C timing circuit for each opening operation. In this connection, a capacitor 200 having a relatively large capacitance in comparison to that of capacitor 34 is provided; and the switching arm 86 switches this capacitor 200 into the R-C circuit in parallel relationship to the capacitor 34 for those opening operations that it is desired should be delayed opening operations.

In this connection, the capacitor 200 has one of its terminals connected to the negative terminal of capacitor 34 through the negative bus 73 and has the connection between its other terminal and the conductor 210 on which signal voltage appears controlled by the switching arm 86. The contact points 1, 2, 3 and 4 of the switching arm 86 are connected to the positive terminal of the capacitor 200, and in each of these connections there is a manually operable switch that can be opened if it is desired that the opening operation corresponding to that particular point be a quick operation or can be closed if it is desired that the corresponding opening operation be a delayed operation. In the disclosed recloser, the manually operable switches 201 and 202 for the contact points 1 and 2, respectively, are shown open; and the manually-operable switches 203 and 204 for the contact points 3 and 4 are shown closed. Accordingly, the recloser is set so that the first two opening operations will be quick operations and the third and fourth opening operations will be delayed operations.

In this regard, the switching arm 86 will be in contact position 1 during the timing interval immediately preceding the first opening operation, and hence the capacitor 200 will be out of the circuit for this first opening operation due to the open switch 201 and will therefore introduce no delay. As pointed out hereinabove, the first opening operation results in the notching solenoid 102 advancing the ratchet wheel 82 and the switching arm 86 through one step into contact position 2. If a second opening operation should closely follow the first opening operation, the switching arm 86 would be in contact position 2 during the timing interval immediately prior to the second opening operation, and thus the capacitor 200 would again introduce no delay, this time due to the open switch 202.

If a third opening operation closely follows the second one, the switching arm 86 would be in contact position 3 during the timing interval immediately preceding the third opening operation. This would result in capacitor 200 being connected in the R-C timing circuit during this interval, and thus the third opening operation would be delayed. The circuit that connects the capacitor 200 in the R-C circuit in parallel with the smaller capacitor 34 extends from the signal voltage bus 210 through conductor 212 switching arm 86, contact point 3, switch 203, and the capacitor 200 to the negative bus 73.

If a fourth opening operation closely followed the third opening operation, the switching arm 86 would be in contact position 4 during the time interval immediately preceding the fourth opening operation, and this would result in the capacitor 200 again being present in the R-C timing circuit to delay opening inasmuch as the switch 204 is closed.

A type of fault situation that the present recloser is especially suited to handle is one in which a second fault follows a temporary fault that the recloser is able to clear without lock-out. In this regard, assume that the recloser operates through three closely successive opening and reclosing cycles in response to the first fault and then is able to remain closed after the third reclosing operation. The switching arms 86 and 87 would then be in position 4. The recloser's remaining closed would indicate that the fault had finally disappeared or had been cleared. But assume that a second fault followed about 10 seconds after the recloser reached its closed position on the third reclosing. It would be highly desirable that the recloser be capable of repeating its complete sequence of operations in response to this fault so as to provide ample opportunity for fault clearance. Some reclosers of which we are aware would be unable to perform in this manner because their sequencing device resets to its normal-at-rest position very slowly. In such reclosers, biasing means returns the sequencing device slowly to its normal position from the time it first reaches its advanced position, but the return movement is very slow. When the closely succeeding second fault occurs, the slow-return sequencing device in such a recloser would most likely not even have returned from position 4 all the way to position 3. As a result, there would be only one opening operation available, and this would be followed by lock-out. If this second fault had been of a temporary nature, this premature lock-out would have prevented the recloser from attempting to clear the fault on the first, second, or third reclosures, which are normally available, but were not for this fault. This can be a significant disadvantage because, in many cases, the recloser would be able on one of these later operations to clear the fault, thus eventually remaining closed and allowing electrical service to continue therethrough, as would be desired.

Some other prior reclosers of which we are aware provide for quick reset of the sequencing device to its normal-at-rest position after the recloser remains closed for a predetermined time, but the reset control device itself is slow in returning to its normal-at-rest condition. If a second fault should develop before the reset control device is able to return to its normal-at-rest condition, then a pumping condition has sometimes developed. In this regard, still referring to these prior reclosers, the reset control device reaches its final condition prematurely during this second fault condition and thus keeps returning the sequencing device to its normal-at-rest position before the sequencing device can reach its lock-out position. This condition repeats itself over and over again causing repetitive operations of the prior recloser with no advancement of the sequencing device capable of producing lock-out. This, of course, can cause serious damage to the recloser and associated apparatus in the event that the second fault is of a permanent nature.

The illustrated recloser is not subject to either of these two undesirable conditions because (1) the reset control device 152, 154 returns quickly to its normal-at-rest position upon expiration of the time period required to close the switch 150 to trigger resetting of the sequencing device 80 and (2) because the sequencing device 80 itself returns quickly to its normal-at-rest position when the reset control device 152, 154 completes its operation. With regard to the performance of the reset control device 152, 154, this device is adjusted so that the time required for it to operate from its position of the drawing to a position to close the switch 150 is just slightly in excess of the longest opening time delay. For example, an eight second operating period may be provided for the reset control device 152, 154 as compared to a five second period for the longest time delay on opening. Thus, if the recloser remains closed for a period just slightly exceeding this longest time delay, the reset control device 152, 154 will close the switch 150 within several seconds to cause resetting of the sequencing device 80. The reset control device 152, 154 itself is quickly returned to its normal position by the return spring 165 so that the reset control device 152, 154 is able to perform in its intended manner immediately after it effects resetting of the sequencing device. The ratio of the return rate of the reset control device to its advance rate is 100 to 1 in a typical embodiment of the invention. Thus, it will be apparent that the pumping condition described with certain prior reclosers will not occur in the present recloser.

With regard to resetting of the sequencing device, it will be apparent that the reset spring 88 can return the sequencing device 80 to the normal position of the drawing immediately upon release of the holding pawl 110 by the reset control device 152, 154. With the reset control device adjusted to release the holding pawl 110 in a time period just slightly exceeding the longest time delay opening period for the recloser, it will be apparent that if the recloser stays closed for a period just slightly exceeding this longest time delay period, then the sequencing device 80 will be immediately and quickly returned to its normal-at-rest position of the drawing. Thus, if the second fault occurs at a time when the recloser has been closed for only slightly more than its longest time delay opening period, the sequencing device will then be completely reset and the recloser will be in readiness to perform a complete sequence of operations, as is desired. In the assumed case, the recloser would be completely reset after eight seconds and thus would be capable of handling the subsequent fault occurring after ten seconds in the intended manner.

It will be apparent that the number of operations to lock-out may be varied without requiring adjustment of our reset control device 152, 154 since this reset control device begins a fresh reset control operation after each reclosing operation. It will be apparent that the delay periods between opening and reclosing of our recloser can be varied without requiring adjustment of the reset control device 152, 154 since the reset control device is not energized or operating during the time the recloser is open. It is only when the A switch 157a is closed in response to reclosing of the recloser that the reset control device 152, 154 begins its timing to eventually effect resetting of the sequencer 80 if the recloser remains closed. The fact that our reset control device 152, 154 is not affected by variations in the number of operations to lock-out and by variations in the time delay periods between opening and reclosing operations enables us to substantially narrow the margin between the operative time for reset control device 152, 154 and the longest time delay opening period without risking loss of this margin.

Another factor that enables us to safely narrow this margin is that the reset control device 152, 154 is quite precise in its timing. In this regard, the motor 152 is preferably a synchronous motor that operates at an essentially constant speed that is unaffected by ambient temperature variations or by voltage variations. This is in distinct contrast to the characteristics of dashpots, which tend to be highly sensitive to temperature variations, and of thermal devices, which are sensitive to both of these variables.

If it is desired to change this timing of the reset control device 152, 154, this can be done simply by varying the position of stop 166 for the cam 154 so that the cam has more or less distance to travel before closing the switch 150.

It will be apparent that it is unnecessary for the notching solenoid 102 to remain energized in order to delay operation of reset control means 152, 154. In this regard, operation of the reset control means is delayed even when the notching solenoid 102 is deenergized after having received an impulse. Operation of the reset control means 152, 154 does not begin until the A switch 157a closes in response to reclosing of the recloser. This independence between the notching solenoid 102 and the reset control means 152, 154 enables the sequencing device to be operated by a single impulse in response to tripping, eliminating any necessity for the notching solenoid 102 to remain continuously energized while the breaker is open, as has been the case in certain prior devices. The disadvantage of a sequencing device that requires continuous energization to delay resetting while the recloser is open is that temporary interruptions in control voltage during this interval will cause extraneous notching operations of the sequencing device or will cause inadvertent resetting of the sequencing device if the interruption is prolonged.

In application S.N. 113,945, Sofianek and Streater, filed May 31, 1961, now patent number 3,114,079 patented December 10, 1963, and assigned to the assignee of the present invention, there is shown a recloser in which the sequencing device 80 is arranged to remain in an advanced position for a long enough time to permit a recloser further down the line to perform a limited series of operations. When the reset control means 152, 154 of the present invention is used in such a recloser, the resetting time must be long enough to allow these operations of the downstream recloser to occur before resetting is completed. But our resetting means is still advantageous in such a recloser inasmuch as we can adjust the reset control means 152, 154 so that the resetting time is only slightly in excess of the longest time that the sequencer 80 will be required to remain in its advanced position to permit the downstream recloser to execute its intended series of operations. Because of the precise performance available with our reset control means, the margin between these two time periods can be adjusted to a near-minimum in our recloser without risking a complete loss of this margin. Thus, we can consistently effect complete resetting of our sequencing means 80 with a near-minimum of delay following the instant when it becomes apparent that resetting is needed.

Restoration of the recloser to its closed position after lock-out is effected by moving the conductive switching member 92 into engagement with a contact 310. This completes an energizing circuit 312 through the coil of solenoid 114, causing the solenoid to release the holding pawl 111. This allows the reset spring 88 of the sequenching device 80 to quickly return the sequencing device from its lock-out position 5 to its normal-at-rest position 1. The switching member 92 is thereafter returned to its position shown in the drawing, thus completing an energizing circuit for closing relay 79 through switching member 87, contact point 1, conductor 314 and B switches 315b and 77b, both of which are closed when the recloser is open. The closing relay 79 responds to completion of this energizing circuit by closing its contacts 78 to produce a closing operation of the recloser in the manner described hereinabove.

Although we have particularly described our invention in connection with an automatic circuit recloser, it will be apparent that in its broader aspects, it also has application to other types of sectionalizing devices that employ sequencing or counting devices, e.g., these sectionalizing devices that remain closed during a series of closely succcessive current interruptions and then open after a predetermined number of closely-successive interruptions have occurred. In this type of device, precisely controlled resetting of the sequencing device can be obtained so as to improve the performance of the sectionalizing device during a second fault condition closely-following one that is cleared before the sectionalizing device can lock out.

While we have shown and described particular embodiments of our invention, it will be obvious to those skilled in the art that various changes and modifications may be made without departing from our invention in its broader aspects and we, therefore, intend in the appended claims to cover all such changes and modifications as fall within the true spirit and scope of our invention.

What we claim as new and desired to secure by Letters Patent of the United States is:

1. An automatic circuit recloser comprising means for opening said recloser in response to an overcurrent, means for automatically reclosing said recloser following an opening operation, electroresponsive sequencing means advanceable in a step-by-step manner through a series of controlling positions, means responsive to initiation of a recloser-opening operation for delivering an electrical impulse to said sequencing means to cause advancement thereof through one step into a new controlling position with each opening operation, in a series of closely succesive opening operations, means for terminating said electrical impuse when said recloser opens and for thereafter preventing energization of said sequencing means while said recloser is open, resetting means for causing quick restoration of said sequencing means to its normal position upon activation, reset control means for activating said resetting means after said reset control means has remained continuously energized for a predetermined period commencing when said reset control means is in a normal condition, means for delaying energization of said reset control means during the period between termination of each of said impulses and reclosing of said recloser and for initiating continuous energization of said reset control means in response to each automatic reclosing of said recloser, means for deenergizing said reset control means in response to an overcurrent high enough to cause opening of said recloser, means for deenergizing said reset control means upon expiration of said predetermined continuous energization period if said recloser has remained closed until said expiration, and means for quickly restoring said reset control means to its normal condition upon deenergization of said reset control means in a small fraction of said predetermined continuous energization period.

2. The recloser of claim 1 in combination with normally inactive time delay means operable when active to delay an opening operation of said recloser, said sequencing means rendering said time delay means active upon movement into a predetermined one of said controlling positions, the length of said predetermined period over which said reset control means is continuously energized to effect restoration of said sequencing means being only slightly greater than the longest time delay said time means is capable of introducing upon opening.

3. An automatic circuit recloser comprising means for opening said recloser in response to an overcurrent, means for automatically reclosing said recloser following an opening operation, electroresponsive sequencing means advanceable in a step-by-step manner through a series of controlling positions, means responsive to initiation of a recloser-opening operation for delivering an electrical impulse to said sequencing means to cause advancement thereof through one step into a new controlling position with each opening operation in a series of closely successive opening operations, means for terminating said electrical impulse when said recloser opens and for thereafter preventing energization of said sequencing means while said recloser is open, resetting means for causing quick restoration of said sequencing means to its normal position upon activation, reset control means comprising an electric motor having an operating part movable at a predetermined speed upon enerization of said motor from a normal position to a final position to effect activation of said resetting means, means for delaying energization of said motor during the period between termination of each of said impulses and reclosing of said recloser and for initiating continuous energization of said motor in response to each automatic reclosing of said recloser, means for deenergizing said motor in response to an overcurrent high enough to cause opening of said recloser, means for deenergizing said motor upon movement of said operating part into said final position if said recloser has remained closed until then, and means operable without affecting the position of said sequencing means for restoring said operating part to its normal position upon deenergization of said motor at a speed much higher than the predetermined speed at which said motor drives said operating part.

4. An automatic circuit recloser comprising means for opening said recloser in response to an overcurrent, means for automatically reclosing said recloser following an opening operation, electroresponsive sequencing means advanceable in a step-by-step manner through a series of controlling positions in response to closely successive operations of said recloser, means responsive to initiation of a recloser opening operation for delivering an electrical impulse to said sequencing means to cause advancement thereof through one step into a new controlling position with each opening operation in a series of closely-successive opening operations, means for terminating said electrical impulse when said recloser opens and for thereafter preventing energization of said sequencing means while said recloser is open, resetting means for causing quick restoration of said sequencing means to its normal position upon activation, reset control means comprising a synchronous electric motor having an operating part movable at a predetermined speed upon energization of said motor from a normal position to a final position to effect activation of said resetting means, means for initiating continuous energization of said motor in response to each automatic reclosing of said recloser, means for deenergizing said motor in response to an overcurrent high enough to cause opening of said recloser, means for deenergizing said motor upon movement of said operating part into said final position if said recloser has remained closed until then, and means operable without affecting the position of said sequencing means for quickly restoring said operating part to its normal position upon deenergization of said motor at a speed much higher than the predetermined speed at which said motor drives said operating part.

5. An automatic circuit recloser comprising means for opening said recloser in response to an overcurrent, means for automatically reclosing said recloser following an opening operation, electroresponsive sequencing means advanceable in a step-by-step manner through a series of controlling positions, means responsive to initiation of a recloser opening operation for delivering an electrical impulse to said sequencing means to cause advancement thereof through one step into a new controlling position with each opening operation in a series of closely successive opening operations, means for terminating said electrical impulse when said recloser opens and for thereafter preventing energization of said sequencing means while said recloser is open, restraining means for holding said sequencing means in any one of said controlling positions between successive advancements of said sequencing means during a series of closely successive recloser operations, resetting means for quickly restoring said sequencing means to its normal position in response to disablement of said restraining means, reset control means for disabling said restraining means after said reset control means has remained continuously energized for a predetermined period commencing when said reset control means is in a normal condition, means for delaying energization of said reset control means during the interval between termination of said impulse after advancement of the sequencing means and reclosing of said recloser and for initiating continuous energization of said reset control means in response to each automatic reclosing of said recloser, means for deenergizing said reset control means in response to an overcurrent high enough to cause opening of said recloser, means for deenergizing said reset control means upon expiration of said predetermined continuous energization period if said recloser has remained closed until then, and restoring means operable without affecting the position of said sequencing means for quickly restoring said reset control means to its normal condition upon deenergization of said reset control means in a small fraction of said predetermined continuous energization period.

6. The recloser of claim 5 in which said reset control means comprises an electric motor having an operating part movable at a predetermined speed upon energization of said motor from a normal position to a final position to effect disablement of said restraining means, in which said means for deenergizing said reset control means comprises means for deenergizing the motor in response to motion of said operating part into said final position, and in which said restoring means comprises spring means for quickly restoring said operating part to its normal position upon deenergization of said motor at a speed much higher than the predetermined speed at which said motor drives said operating part.

7. A sectionalizing device for connection in a power line comprising electroresponsive sequencing means advanceable in a step-by-step manner through a series of controlling positions in response to closely-successive operations that each result in the interruption of current through said power line, means responsive to each of said closely-successive operations for delivering an electrical impulse to said sequencing means to cause advancement thereof through one step into a new controlling position upon each of said closely-successive operations, means for terminating said electrical impulse when said current is interrupted and for thereafter preventing energization of said sequencing means until reestablishment of current through said power line, resetting means for causing quick restoration of said sequencing means to its normal position upon activation, reset control means comprising a synchronous electric motor having an operating part movable at a predetermined speed upon energization of said motor from a normal position to a final position to effect activation of said resetting means, means for initiating energization of said motor in response to the reestablishment of current through said power line following an interruption, means for deenergizing said motor in response to the occurrence of an operation resulting in the interruption of current through said power line following said reestablishment, means for deenergizing said motor upon movement of said operating part into said final position if said reestablished current continues to flow through said power line until then, and means operable without affecting the position of said sequencing means for quickly restoring said operating part to its normal position upon deenergization of said motor at a speed much higher than the predetermined speed at which said motor drives said operating part.

References Cited by the Examiner

UNITED STATES PATENTS

| 1,537,727 | 5/25 | Anderson | 317—23 |
| 2,582,027 | 1/52 | Goff | 317—22 |
| 2,633,514 | 3/53 | McCurry et al. | 200—89 |
| 2,922,005 | 1/60 | Cameron et al. | 200—89 |

SAMUEL BERNSTEIN, *Primary Examiner.*